(12) United States Patent
Hesse et al.

(10) Patent No.: US 7,416,246 B2
(45) Date of Patent: Aug. 26, 2008

(54) MOTOR VEHICLE WITH AT LEAST TWO MOVABLE PARTS

(75) Inventors: Jan Hesse, Gechingen (DE); Thomas Halbweiss, Remseck (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/584,977

(22) Filed: Oct. 23, 2006

(65) Prior Publication Data

US 2007/0102966 A1    May 10, 2007

Related U.S. Application Data

(63) Continuation-in-part of application No. 11/062,379, filed on Feb. 22, 2005, now abandoned.

(30) Foreign Application Priority Data

Feb. 23, 2004   (DE) ..................... 10 2004 009 049

(51) Int. Cl.
*B60J 7/047*   (2006.01)
(52) U.S. Cl. .......................... 296/216.01; 296/220.01; 296/222
(58) Field of Classification Search ................. 296/216.03–216.05, 220.01, 222, 216.01
See application file for complete search history.

(56) References Cited

U.S. PATENT DOCUMENTS

| 6,443,520 | B1 * | 9/2002 | Schmaelzle et al. ..... 296/216.08 |
| 6,502,898 | B1 | 1/2003 | Salz |
| 6,893,083 | B2 * | 5/2005 | Engl ..................... 296/216.03 |

FOREIGN PATENT DOCUMENTS

| DE | 696 22 995 T2 | 10/1997 |
| GB | 573355 | 11/1945 |
| JP | 361016128 | 1/1996 |

* cited by examiner

*Primary Examiner*—Dennis H Pedder
(74) *Attorney, Agent, or Firm*—Brooks Kushman P.C.

(57) ABSTRACT

A motor vehicle roof having at least two laterally adjacent parts with respect to the motor vehicle's longitudinal axis when the parts are in a closed position. The laterally adjacent parts may be moved between the closed position and an open position by moving one or both of the laterally adjacent parts in a translational movement parallel to the longitudinal axis of the vehicle. The laterally adjacent parts are retained between and parallel to two side roof frames that are permanently connected to the body. The laterally adjacent parts may be moved to an open position above or below a rear roof panel. The rear roof panel extends across the vehicle in a transverse direction between the side roof frames and is movable in a longitudinal direction to a position above or below the laterally adjacent roof panels. A front roof panel may be provided that may be raised on a back edge to provide a wind deflector.

8 Claims, 6 Drawing Sheets

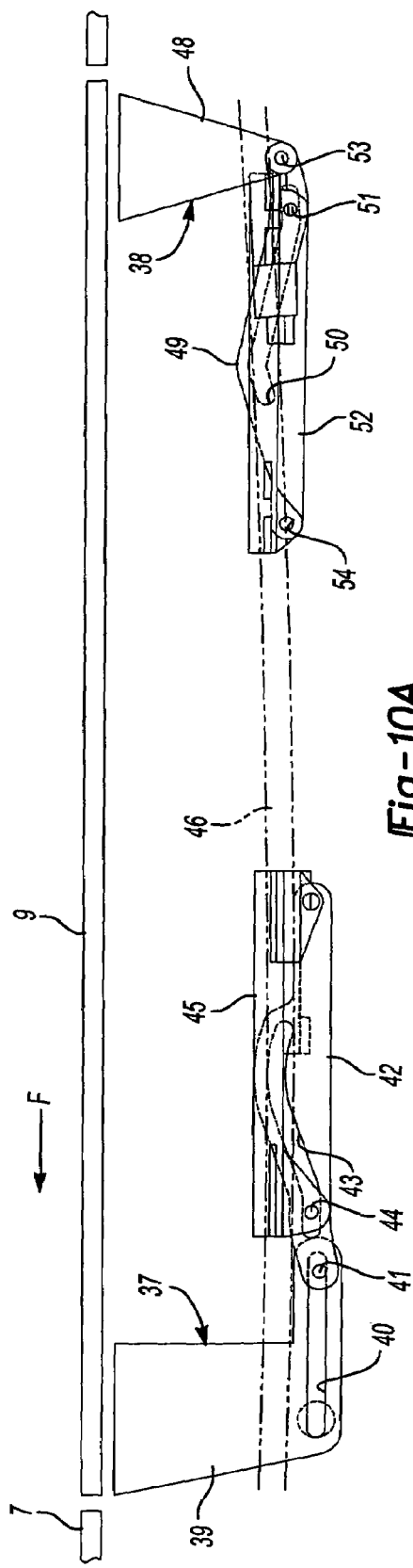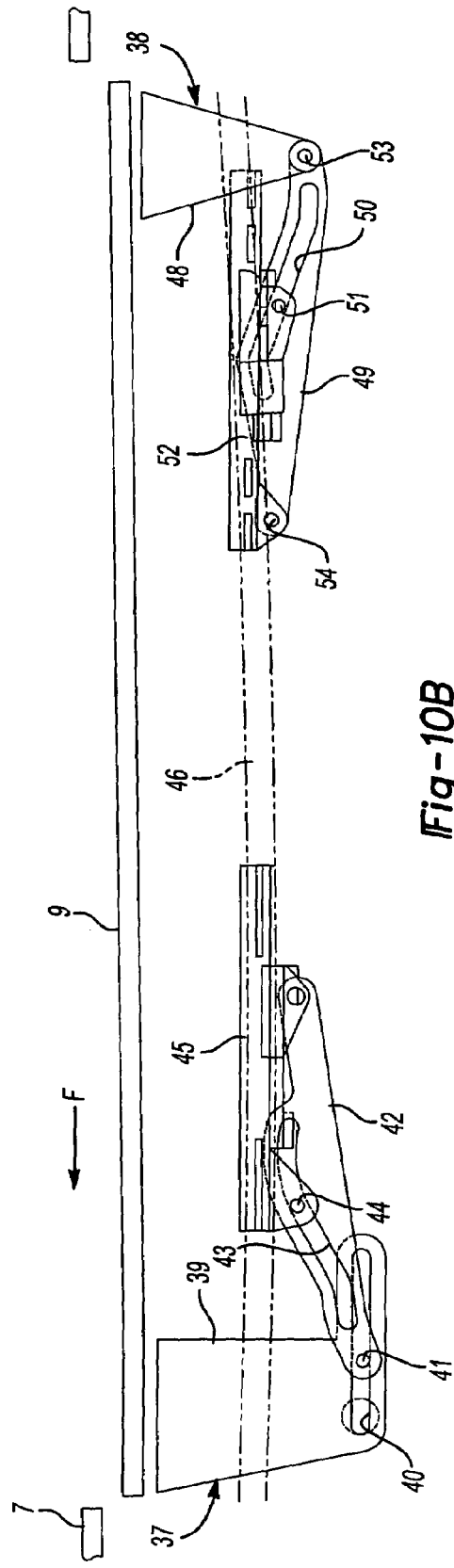

MOTOR VEHICLE WITH AT LEAST TWO MOVABLE PARTS

CROSS-REFERENCE TO RELATED APPLICATIONS

This application is a continuation-in-part of U.S. application Ser. No. 11/062,379 filed Feb. 22, 2005 now abandoned, which, in turn, claims priority to German application 10 2004 009 049.1 filed Feb. 23, 2004.

BACKGROUND OF THE INVENTION

1. Field of the Invention

The present invention relates to a motor vehicle roof that has several movable panels that may be moved independently between a closed position and a variety of open positions.

2. Background Art

Motor vehicle roofs are available that include retractable hard tops, convertible tops, hard tops having sun roofs, and hard tops having removable targa tops.

One example of a hard top motor vehicle roof is disclosed in published German application DE 101 13 427 A1 that has two rigid parts that are disposed next to one another with respect to the longitudinal axis of the vehicle when the roof is closed. The panels are stored in a storage compartment at the back of the vehicle when the roof is open. The position of the parts may be changed by means of a kinematic movement system so that only the A pillars and windshield project above the belt line of the vehicle when the roof is open. No other roof parts are located above the belt line except the windshield and windshield frame.

Another prior art roof system is disclosed in the publication DE 94 06 435 U1 that describes a vehicle roof that is solidly connected to the body of a vehicle and has a roof opening that is directly adjacent to the windshield frame. Two roof parts may be inserted into the opening so that they lie next to one another. The roof may be converted into a targa position by manually removing one of the roof parts from the roof opening. This roof concept does not allow for converting the roof to a convertible position.

Another prior art motor vehicle roof is disclosed in U.S. Pat. No. 4,801,174 that discloses a transparent roof plate which can be moved with a translational motion between a closed position and an open position. The transparent roof plate is moved within the confines of a side roof frame that is permanently fastened to the body. The roof plate is pushed beneath a back roof plate to open the roof.

The present invention is directed to the problem of creating a motor vehicle roof that exposes a large roof opening in an open position and which is movable to a closed position with minimal effort. There is also a need for a roof that can be arranged in a number of different open positions.

These and other problems are addressed by Applicant's invention as summarized below.

SUMMARY OF THE INVENTION

According to the present invention, at least two laterally adjacent movable parts of the motor vehicle roof are arranged in a closed position to lie next to one another with respect to the vehicle's longitudinal axis. The two laterally adjacent movable parts are arranged parallel to the side roof frame that is permanently fastened to the body of the vehicle. The two laterally adjacent movable parts are moved in a simple translational motion to change the roof from its closed position one of several its open positions.

According to another aspect of the invention, the two laterally adjacent movable parts of the roof can be moved by a motor drive. The two laterally adjacent movable parts can be relatively small because they are disposed next to one another. Even though relatively small roof parts are provided, a large roof opening can be provided because each part extends between the side frame immediately adjacent to the roof part and the middle of the roof. Both laterally adjacent roof parts border one another in the middle of the roof. The laterally adjacent roof parts have less surface area than roof parts which extend over the entire width of the roof because they extend across only half of the width of the roof. The weight of each roof part may be minimized and less force is required to drive each roof part to a desired position.

According to another aspect of the invention, the roof parts may be repositioned to provide different roof opening positions. For example, in one embodiment of the invention, the laterally adjacent roof parts lie next to one another and may be moved to open positions independently of one another. The laterally adjacent roof parts are laterally adjacent when they are in their closed position but may be offset in the fore-and-aft direction when one or both panels are shifted to their open position. The driver may open only the roof part located over the passenger seat while leaving the roof part arranged immediately over the driver seat in a closed position.

While according to one embodiment of the invention, the laterally adjacent roof parts may be movable in the direction of the vehicle's longitudinal axis. Alternatively, it is also possible for the laterally adjacent roof panels to be moved in the vehicle transverse direction which is transverse to the vehicle's longitudinal axis. If the panels are movable in the transverse direction, the roof parts may be arranged next to one another when closed and moved laterally into a position with the panels lying above one another. The laterally adjacent roof parts may be moved in the longitudinal direction or transverse direction to permit opening and closing the roof either only in the area above the driver seat or only in the area above the passenger seat. It is possible to move the roof panels in either a longitudinal or transverse direction to form a stack of roof parts with roof parts lying above one another. The stack of roof parts can be moved to expose the entire area of the roof opening.

A longitudinal member may be securely fastened to the body in the middle of the roof opening. The inside edges of the laterally adjacent roof parts may be guided or supported by the longitudinal member. The longitudinal member may provide substantially more stability and may also simplify the movement of the laterally adjacent roof parts from the closed position into the open position. For example, each roof part can be guided with respect to the roof sections fastened to the body on three bearing units. Two of the bearing units may lie on the outside front and outside back areas, respectively, and one bearing unit may lie on the inside front side area of each roof part. The later bearing unit may be supported by the central longitudinal member that is fastened to the body. To open the roof, the movable parts may be moved in the direction of the vehicle's longitudinal axis. If the parts are moved in the direction of the longitudinal axis, each roof part's inner front bearing unit that is supported and guided on the longitudinal member can travel along the longitudinal member toward the back of the vehicle. When one of the laterally adjacent roof parts is open, the outer back bearing unit may be disposed in the back area of the roof frame and the inner front bearing unit may be located at the back of the central longitudinal member.

According to another aspect of the invention, each bearing unit may comprise a roller or a low-friction sliding block that is guided in the outer side frame and the central longitudinal member.

In another embodiment of the invention, the laterally adjacent two roof parts may be arranged next to one another and may be bordered by a back roof part that is also movable with a translational motion in the direction of the vehicle's longitudinal axis. The back roof part can be moved independently of the other roof parts to provide additional roof opening arrangements. For example, it is possible to leave the two front roof parts lying next to each other in a closed position and move the back roof part forward and either beneath or above the two front parts. This may result in an opening in the roof above the back passenger area. It is also possible to move the two front roof parts partially rearwardly and move the back roof part partially forwardly to create a smaller opening in the front roof section and a smaller opening in the back roof section with the laterally adjacent and rear roof parts remaining between the front and back open roof sections.

According to another aspect of the invention, one or more roof parts may be made of a transparent material such as, for example, polycarbonate or glass. By using a transparent material for the roof part the vehicle interior may be provided with light through the roof part into the vehicle interior even when the motor vehicle roof is in its closed position.

The above aspects and other advantages of the various embodiments of the invention will be better understood in view of the attached drawings and following detailed description of the illustrated embodiments.

BRIEF DESCRIPTION OF THE DRAWINGS

FIGS. 10A-10D are partial cross-sectional views along a rear roof section illustrating movement of the rear roof.

DETAILED DESCRIPTION OF THE PREFERRED EMBODIMENT(S)

Figure 1:
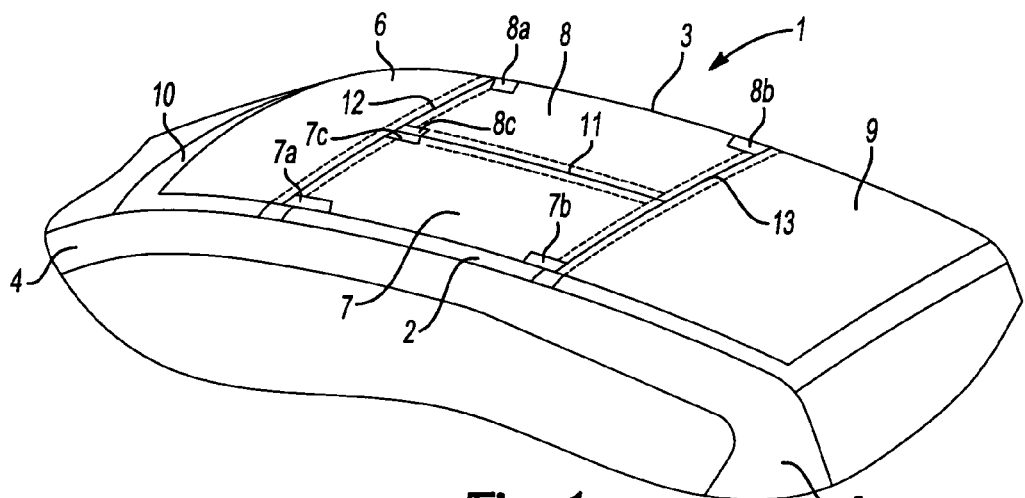
FIG. 1 is a perspective view of a motor vehicle roof with side roof frames that are permanently secured to the body that has movable laterally adjacent front roof parts located between the roof frames and lying parallel to the motor vehicle's longitudinal axis and a back roof part that extends over the entire width of the roof with all of the roof parts being shown in a closed position.

Referring to FIG. 1, a motor vehicle roof 1 is illustrated that has side roof frames 2, 3 that are permanently connected to the body of the motor vehicle. The side roof frames 2 merge into the body's A-pillars 4 in the front area of the motor vehicle. The side roof frames merge into the body's C-pillars 5 in the back area of the motor vehicle. Roof parts 6, 7, 8 and 9 lie in a roof opening that may be selectively covered by the roof parts 6-9. Front roof part 6 is located adjacent to a cross member 10, or header, of the windshield frame of the vehicle. Front roof part 6 extends between the two roof frames 2 and 3 and spans the entire width of the roof. Two parallel, or laterally adjacent, roof parts 7 and 8 are provided behind front roof part 6. Roof parts 7 and 8 may also be referred to as side front roof parts. Roof parts 7 and 8 are disposed parallel to the motor vehicle's longitudinal axis and extend across half of the width of the roof. Back roof part 9 is disposed in the roof opening behind the two laterally adjacent roof parts 7 and 8 and between the two roof frames 2 and 3.

Front roof part 6 is disposed in the opening and may be connected to the body so that it is immobile relative to the body. Alternatively, roof part 6 may be designed to be shifted to a position with the back edge of the roof part 6 being raised to function as a wind deflector.

The two roof parts 7 and 8 are disposed laterally adjacent to one another and are movable. The roof parts 7 and 8 may be moved between a closed position, shown in FIG. 1, and several different open positions. One or both of the roof parts 7, 8 may be pushed backward in a translational motion parallel to the motor vehicle's longitudinal axis. The roof parts 7 and 8 may be designed to move above or beneath the back roof part 9. Roof parts 7 and 8 lie next to one another and can be moved independently of one another. Back roof part 9 may also be moved from the closed position, shown in FIG. 1, to an open position in which roof part 9 is pushed forward in a translational motion parallel to the motor vehicle's longitudinal axis. Roof part 9 may be shifted to a position above or below roof parts 7 and 8 to open a back roof portion of the roof opening.

Roof parts 7 and 8 are arranged laterally adjacent to one another and between the associated side roof frames 2 and 3, respectively. A middle longitudinal member 11 may be provided that lies in the roof opening and is aligned with the motor vehicle's longitudinal center plane. The longitudinal member may be permanently connected to the body in the motor vehicle roof and run between the two cross members 12 and 13. Cross members 12 and 13 extend in the transverse direction between the side roof frames 2 and 3 to span the entire width of the roof. The front cross member 12 is located in the area of the back edge of the front roof part 6. Front cross member 12 forms a support for the front edge of the two roof parts 7 and 8. Back cross member 13 forms a support for the back edge of the roof parts 7 and 8. Back cross member 13 also forms the front edge of the back roof part 9. The two cross members 12 and 13 and the connecting longitudinal member 11 form an H when viewed in the transverse direction in a top plan view.

Each of the roof parts 7 and 8 have three bearing points or bearing units 7a, 7b, 7c and 8a, 8b, and 8c. Each of the roof parts 7 and 8 is mounted by the bearing units 7a-7c and 8a-8c, respectively. The bearing units 7a-7c and 8a-8c may be made in the form of rollers or low-friction sliding blocks. Roof part 7 has outboard bearing units 7a and 7b. Roof part 8 has outboard bearing units 8a and 8b. The third bearing units 7c and 8c are disposed in the inner-front area of roof parts 7 and 8, respectively. Outer bearing units 7a, 7b, and 8a, 8b may travel along side roof frames 2 or 3. Inner bearing units 7c and 8c can travel along the middle longitudinal member 11. When the roof parts 7 and 8 are moved rearwardly to their full open position, inner bearing units 7c and 8c are moved on the longitudinal member 11 to the vicinity of the back cross member 13.

Figure 2:
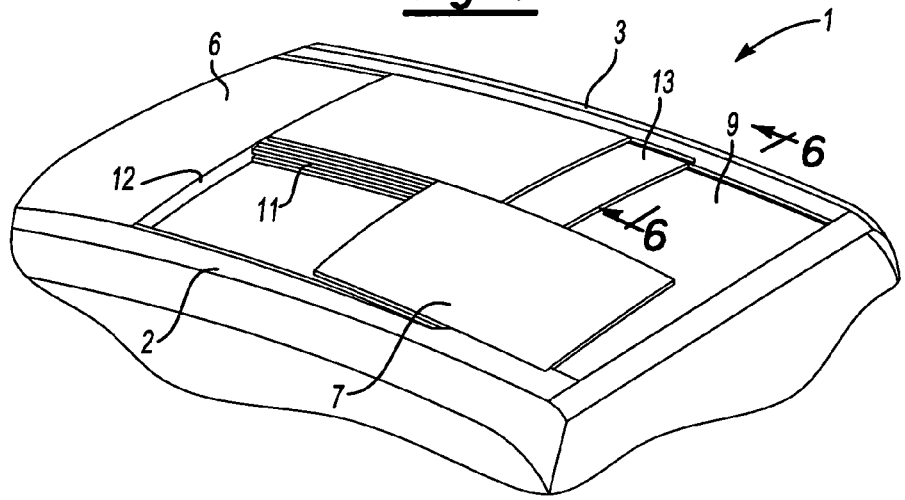
FIG. 2 is a perspective view of the motor vehicle roof of FIG. 1 shown in a partially open position with one of the front roof parts moved rearwardly over the back roof part.

Referring to FIG. 2, roof part 7 on the left side of the longitudinal member 11 is moved toward the back to open a roof section above the passenger seat. Roof part 7 is disposed in its open position above back part 9. Back part 9 is shown in its closed position in FIG. 2. The back roof part 9 can be displaced in height to facilitate moving roof parts 7 and 8. For example, the front edge of roof part 9 may be raised to permit roof parts 7 or 8 to be moved to a position below the roof part 9 or may be lowered to permit roof parts 7 and 8 to slide over roof part 9. As illustrated, roof part 7 is disposed above back roof part 9 in FIG. 2. This may be facilitated by lowering the back roof part 9.

Figure 3:
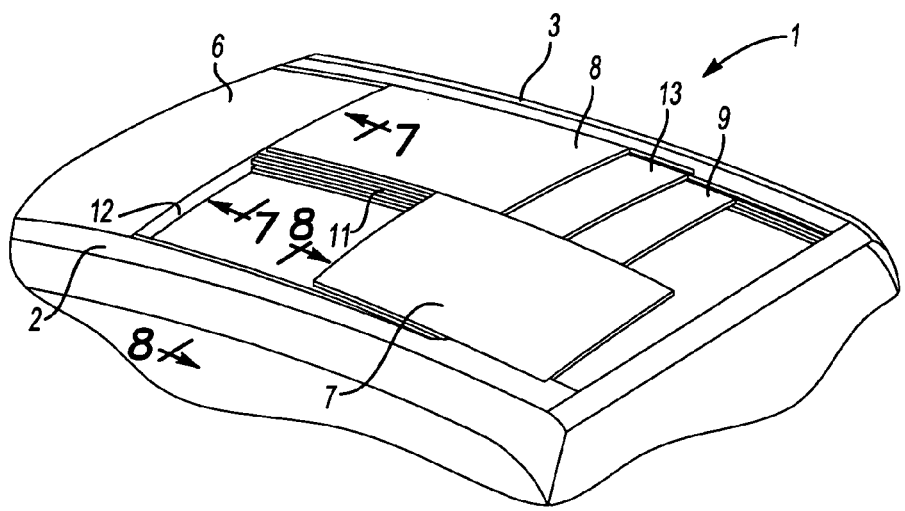
FIG. 3 is a perspective view of the motor vehicle roof of FIG. 1 shown in an open position with one of the two front roof parts moved back and over the rear roof part and with the back roof part moved partially under the front roof parts.

Referring to FIG. 3, roof part 7 is shown in its open position. Roof parts 7 and 8 may be shifted rearwardly to open portions of the roof opening above the driver seat and above the passenger seat. Both roof parts 7 and 8 may be disposed next to one another after being shifted rearwardly and may be disposed above the back roof part 9. As shown in FIG. 3, back roof part 9 is in its partially open position.

Figure 4:
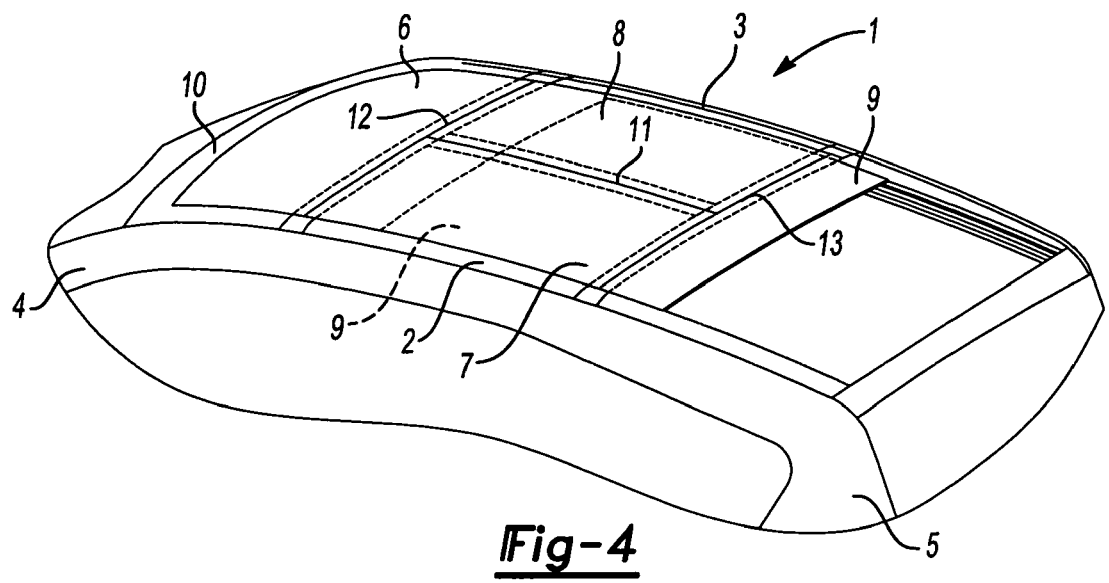
FIG. 4 is a schematic perspective view of the motor vehicle roof of FIG. 1 shown in an open position with the back roof part moved forward under the front roof parts.

Referring to FIG. 4, the two roof parts 7 and 8 are disposed in their closed position next to one another and adjacent to the front roof part 6. Back roof part 9 is shown in its open position. Back roof part 9 is shown after being shifted forwardly into a position in which it is disposed beneath roof parts 7 and 8 to open a portion of the roof opening comprising the back of the roof opening.

Figure 5:
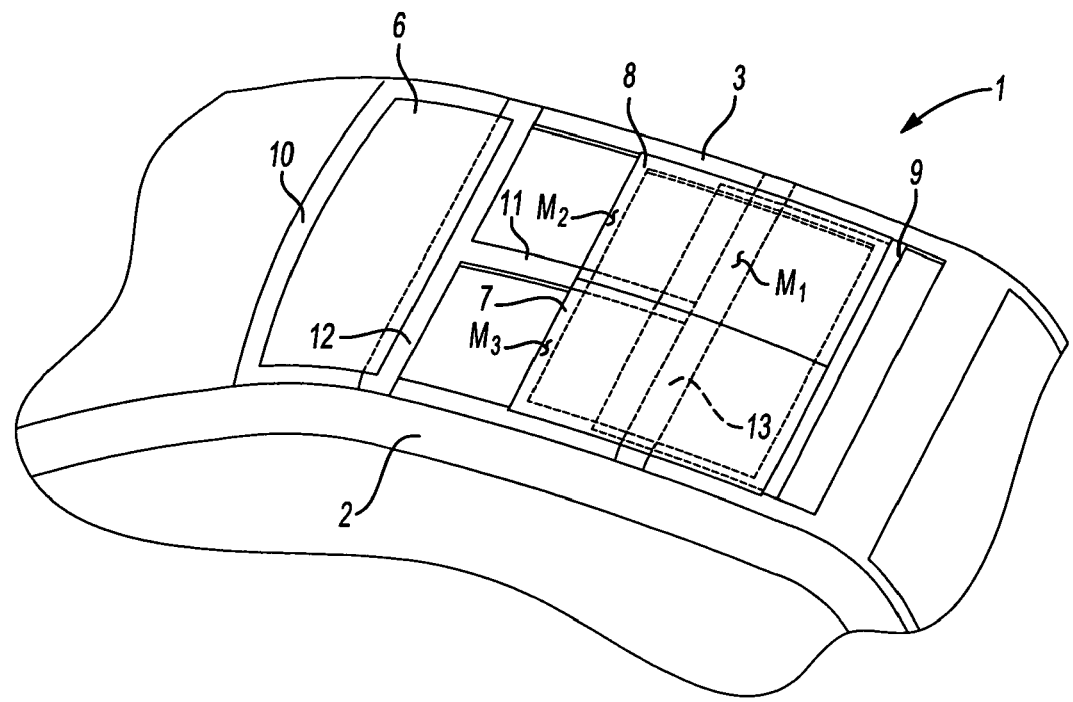
FIG. 5 is a schematic perspective view of the motor vehicle roof of FIG. 1 shown in an open position in which the two front roof parts are moved partially rearwardly over the back roof part to form an opening both in front of the two front roof parts and with the back roof part pushed forward to form an opening in back of the back roof part.

Referring to FIG. 5, roof parts 7 and 8 are shown disposed next to one another and displaced partially toward the back into a partially open position. Back roof part 9 is shown being displaced forwardly into a partially open position. Roof parts 7 and 8, and roof part 9 form a stack of roof parts, with roof part 9 lying beneath roof parts 7 and 8. In this position, both a front portion and a rear portion of the roof opening are opened.

Figure 6:
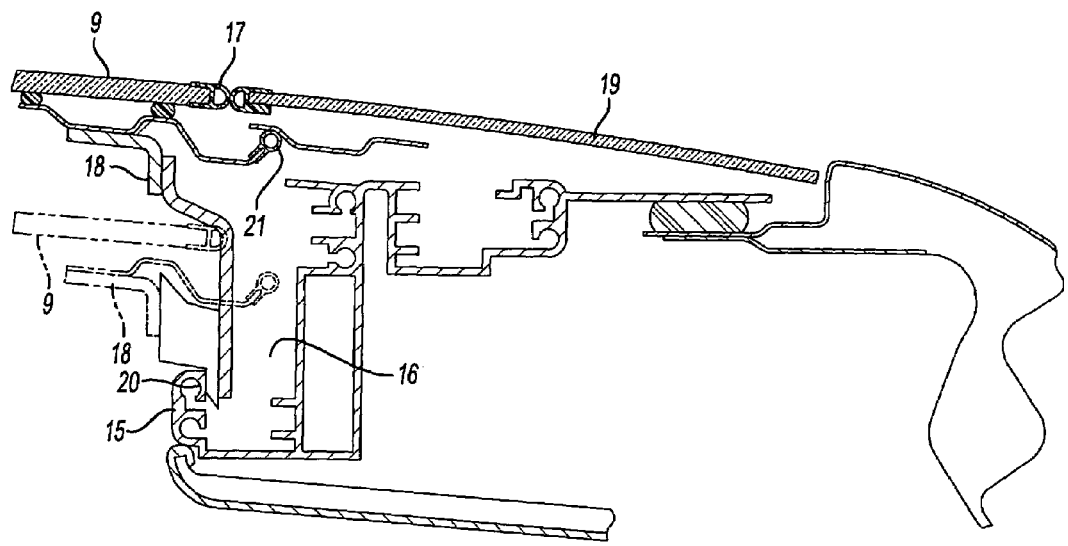
FIG. 6 is a partial cross-sectional view of the roof on the right side roof part taken along the line 6-6 in FIG. 2.

Referring to FIG. 6, the rear roof part 9 is retained by a rear roof bearing unit 14 and is sealed to the adjacent right side cover panel 15 by a pair of seals 16, 17. The rear roof part 9 is shown in a closed position adjacent to and contiguous with the cover panel 15. The supporting structure for the rear roof part comprises, in part, a right side guide rail 18, the rear roof bearing unit 19, and a rear guide track 20. The right side guide rail 18 defines a cavity 21 for channeling water that either bypasses the rear roof seals 16, 17 or otherwise enters the cavity 21. The rear bearing unit 14 is moved by cables (not shown) that may be attached through an extension arm 22 to an electric motor ($M_1$ as shown in FIG. 5) that may be housed under the back cross member 13. The open position of the rear roof part 9 and rear roof bearing unit 14 are indicated by dashed lines in FIG. 6.

Figure 7:
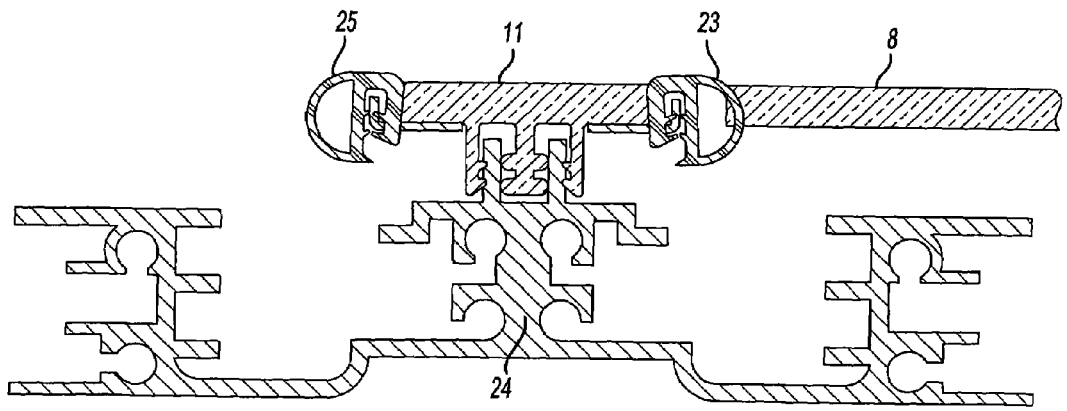
FIG. 7 is a partial cross-sectional view of the roof in the center taken along the line 7-7 in FIG. 3.

Referring to FIG. 7, a right side central seal 23 is shown attached to the middle longitudinal member 11. The right roof part 8 contacts the right side central seal 23 when closed. The middle longitudinal member 11 also includes a center guide rail 24 that is attached to a lower portion of the middle longitudinal member 11. A left side central seal 25 is attached to the middle longitudinal member 11 on the opposite side from the right side central seal 23. As shown in FIGS. 3 and 7, the left roof part 7 is open.

Figure 8:
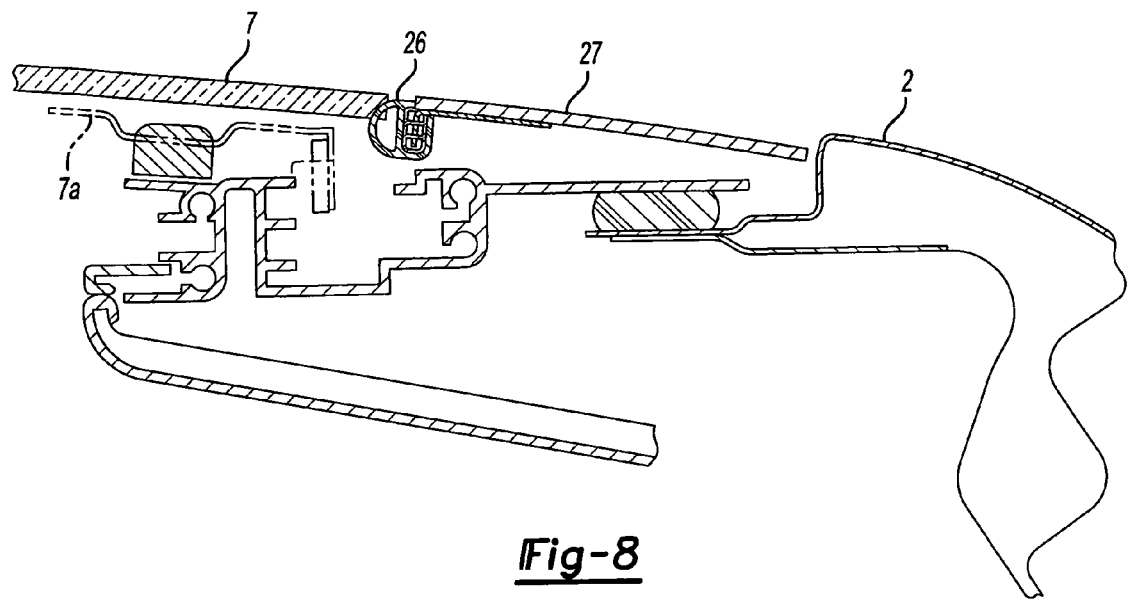
FIG. 8 is a partial cross-sectional view of the roof on the left side roof section taken along line 8-8 in FIG. 3.

Referring to FIG. 8, left roof part 7 is retained on the front left bearing unit 7a that is shown in phantom lines when the left side roof part 7 is in a closed position. The left side roof part 7 contacts a first portion of a left side cover panel seal 26 that is attached to a left side cover panel 27. The left side cover panel 27 extends between the left roof part 7 and the roof frame 2.

Figure 9:
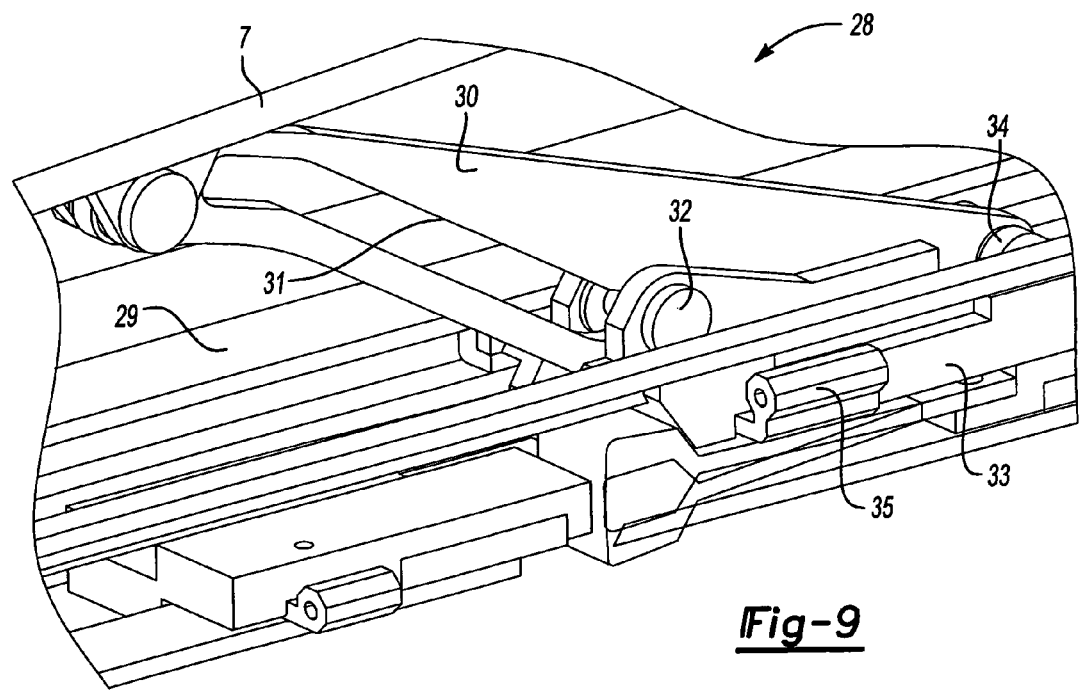
FIG. 9 is a partial view of bearing units for retaining a roof section.

Referring to FIG. 9, a roof carrier 28 is shown that extends between roof part 7 and a supporting guide rail 29. The carrier 28, which may also be referred to as a bearing unit 7a-c, 8a-c or 9a-c, may take different forms depending upon the location and space available. The carrier 28 includes an arm 30 that has a slot 31 that receives a movable pin 32. The pin 32 moves in the slot in response to the application of a motive force on a carriage portion 33 of the carrier 28 that has rollers that follow the guide rail 29. The pin 32 follows the slot 31 to raise or lower the roof part to which it is attached depending upon the direction of movement of the carriage portion 33 and the contour of the slot 31.

The carriage portion 33 is moved by a cable (not shown) that may be attached to the carriage portion 33 at an octagonal-shaped follower 35. The follower 35 is received in a similarly shaped follower receptacle in one of the guide rails. The cable is pulled by a motor M that may be secured to the vehicle roof 1 either below one of the front or back cross members 12, 13 or in another location depending upon the space available. The cable may be in the form of a loop that may be driven bi-directionally by one of the motors M.

The configuration of the components of the bearing units is determined by the space available for the bearing units. The structure and function of the bearing units, and alternative types of bearing units, may be better understood by reference to U.S. Pat. No. 6,502,898, which is hereby incorporated by reference.

Figure 10C:
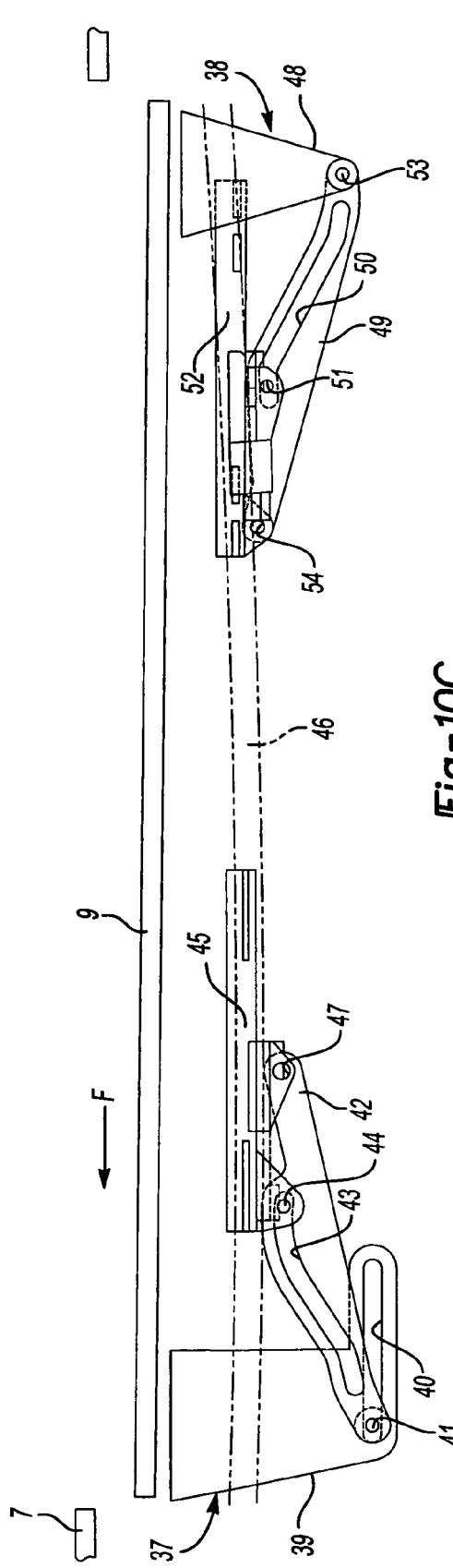
Figure 10D:
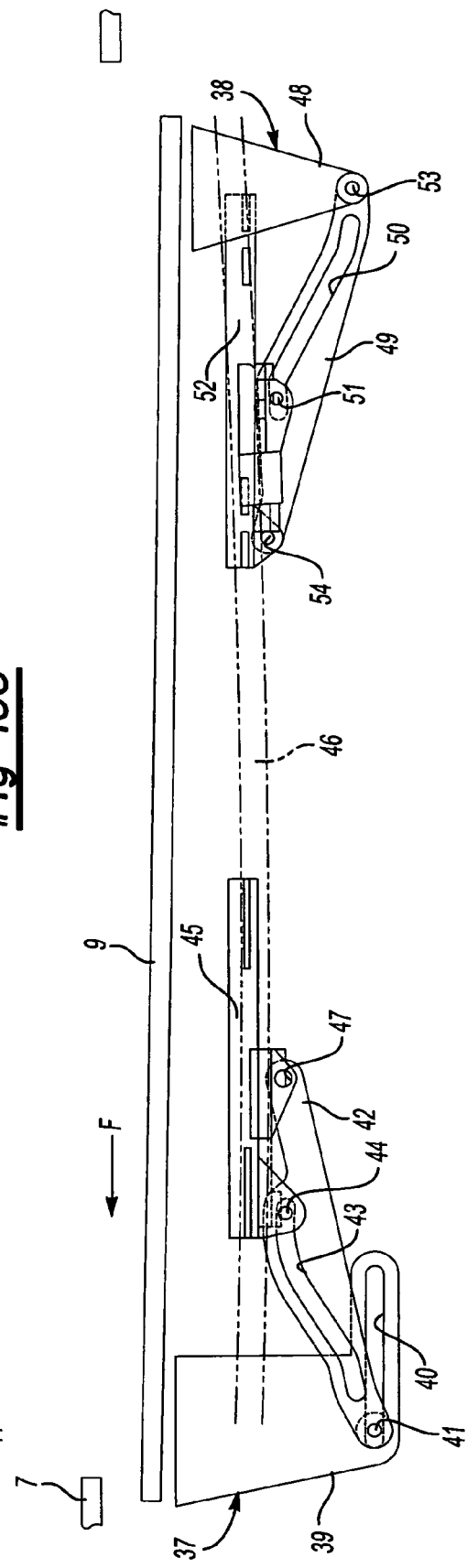

FIGS. 10A-D illustrate one embodiment of a linkage for lowering and shifting the location of a roof panel, such as roof panel 9. The sequence of movements illustrated in FIGS. 10A-D show a roof panel 9 initially in its closed position. FIGS. 10B and 10C illustrate the roof panel being lowered in two steps and FIG. 10D shows the roof panel lowered and beginning to move in the forward direction to be stowed underneath the right and left roof parts 7 and 8.

Referring specifically to FIG. 10A, the rear roof part 9 is shown in conjunction with a front carriage assembly 37 and a rear carriage assembly 38 that support the roof part 9 in its closed position as shown in FIG. 10A. The front carriage generally indicated by reference numeral 37 includes a front bracket 39 that is attached on its upper end to the rear roof part 9. The front bracket 39 defines a lost motion slot 40 in which an end pin 41 is received. The end pin 41 is attached to an arm 42. The arm 42 defines a vertical positioning slot 43 that receives a vertical positioning pin 44. The arm 42 is connected to a front carriage truck 45. The front carriage truck 45 is received by a guide track 46 that is shown in phantom in FIG. 10A. The rear carriage assembly 38 includes a bracket 48 that is secured on its upper end to the rear roof part 9. An arm 49 is secured to the bracket 48. The arm 49 defines a vertical positioning slot 50 in which a vertical positioning pin 51 is received. The arm 49 extends from the bracket 48 to a rear carriage truck 52. The arm 49 is connected to the bracket 48 by a pivot pin 53.

As shown in FIG. 10A, the end pin 41 is shown disposed in the rear portion of the lost motion slot 40. The vertical positioning pin 44 is disposed at the forward end of the vertical positioning slot 43 and the arm 42 extends in a generally horizontal orientation. The rear carriage assembly 38, as shown in FIG. 10A, is shown with the vertical positioning pin 51 at the rear end of the vertical positioning slot 50. The arm 49 extends generally horizontally between bracket pivot pin 53 and truck pivot pin 54.

The beginning of the retraction cycle is shown in FIG. 10B with the rear roof panel 9 being lowered below the plane of the front roof part 7. The front carriage truck 45 is moved by the cable in the forward direction. The end pin 41 is moved forwardly within the lost motion slot 40 while the vertical positioning pin 44 moves along the vertical positioning slot 43 that causes the rear roof panel 49 to move lower. The arm 42 pivots about the pivot pin 47. The rear carriage assembly 38 lowers the rear portion of the rear roof part 9. The vertical positioning pin 51 moves through the vertical positioning slot 50. This causes the arm 49 to pivot about the truck pivot pin 54 as the rear roof part 9 is lowered.

Referring to FIG. 10C, the end pin 41 is disposed in the forward end of the lost motion slot 40 and the vertical positioning pin 44 is at the rear end of the vertical positioning slot 43 wherein the front portion of the rear roof part 9 is lowered to its maximum extent. The rear carriage assembly 38 is also shown in its fully lowered position in FIG. 10C wherein the vertical positioning pin 51 is in the forward end of the vertical positioning slot 50 so that the rear end of the rear roof part 9 is now lowered to its maximum extent. The arm 49 is pivoted about the truck pivot pin 54.

As shown in FIG. 10D, the rear roof part 9 is beginning to translate in a forward direction after the rear roof part 9 is lowered to its maximum extent as shown in FIG. 10C. In FIG. 10D, continued movement of the cable (not shown) causes the front carriage truck 45 and rear carriage truck 52 to move in the forward direction along the guide track 46. The front and rear carriage assemblies 37, 38 move with the rear roof panel 9 to a position below the left roof part 7.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A motor vehicle roof defining a roof opening comprising:
    at least two laterally adjacent moveable roof parts that are disposed next to one another and partially covering the roof opening in a closed position with respect to the motor vehicle's longitudinal axis, the movable roof parts being movable between the closed position and an open position, the roof parts are laterally adjacent to one another in the closed position;
    means for retaining the roof parts between side roof frames that are permanently secured to the body, each of the laterally adjacent roof parts maybe shifted between the open and closed position along the motor vehicle's longitudinal axis;
    wherein the roof opening has a central longitudinal member and is bounded, in the closed position, by an edge of a movable front roof part, a movable rear roof part and the laterally adjacent roof parts; and
    wherein the laterally adjacent roof parts are each guided with respect to at least one roof section that is permanently secured to the body on first bearing units lying in the outer front area of the laterally adjacent roof part, a second bearing unit lying in the outer back area of the laterally adjacent roof part, and a third bearing unit disposed in the inner front area of the laterally adjacent roof part, wherein the third bearing units are guided on the central longitudinal member.

2. The motor vehicle roof of claim 1 wherein the laterally adjacent roof parts may be moved independently of one another.

3. The motor vehicle roof of claim 1 wherein the rear roof part is provided that is rearwardly adjacent at least one laterally adjacent roof part.

4. The motor vehicle roof of claim 1 wherein the rear roof part is movable in the direction of the motor vehicle's longitudinal axis.

5. The motor vehicle roof according to claim 1, wherein the front roof part is mounted in front of the two laterally adjacent roof parts.

6. The motor vehicle roof according to claim 1 wherein at least one roof part is made of a transparent material.

7. The motor vehicle roof according to claim 6 wherein the roof part is made of polycarbonate.

8. The motor vehicle roof according to claim 6 wherein the roof part is made of glass.

* * * * *